United States Patent
Dettori et al.

(10) Patent No.: US 9,590,873 B2
(45) Date of Patent: *Mar. 7, 2017

(54) COMPOSITE SERVICE PRE-PROVISIONING

(71) Applicant: International Business Machines Corporation, Armonk, NY (US)

(72) Inventors: Paolo Dettori, Hartsdale, NY (US); David C. Frank, Ossining, NY (US); Seetharami R. Seelam, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,209

(22) Filed: Dec. 10, 2015

(65) Prior Publication Data

US 2016/0094409 A1    Mar. 31, 2016

Related U.S. Application Data

(63) Continuation of application No. 14/173,417, filed on Feb. 5, 2014, now Pat. No. 9,258,196.

(51) Int. Cl.
*G06F 15/173* (2006.01)
*H04L 12/24* (2006.01)

(52) U.S. Cl.
CPC .......... *H04L 41/50* (2013.01); *H04L 41/5051* (2013.01)

(58) Field of Classification Search
CPC .. H04L 41/50; H04L 12/4662; H04L 63/0407
USPC ............ 709/223, 200, 203, 220, 226; 726/5
See application file for complete search history.

(56) References Cited

U.S. PATENT DOCUMENTS

| | | |
|---|---|---|
| 8,279,782 B2 | 10/2012 | Abdel-Ghaffar et al. |
| 8,374,900 B2 | 2/2013 | Sato et al. |
| 8,473,962 B2 | 6/2013 | Hebert et al. |
| 2004/0215550 A1 | 10/2004 | Preist et al. |
| 2006/0146877 A1 | 7/2006 | Srivastava |
| 2006/0235715 A1 | 10/2006 | Abrams et al. |
| 2007/0251998 A1 | 11/2007 | Belenki |
| 2007/0294668 A1 | 12/2007 | Mohindra et al. |
| 2011/0055368 A1 | 3/2011 | Colrain et al. |
| 2011/0131277 A1 | 6/2011 | Niemoeller et al. |
| 2012/0110186 A1 | 5/2012 | Kapur et al. |
| 2012/0324069 A1 | 12/2012 | Nori et al. |

(Continued)

FOREIGN PATENT DOCUMENTS

| | | |
|---|---|---|
| EP | 0473913 A2 | 3/1992 |
| WO | 2011067099 A2 | 6/2011 |
| WO | 2013082119 A1 | 6/2013 |

OTHER PUBLICATIONS

Aggarwal, et al., "Exploiting Virtualization for Delivering Cloud-based IPTV Services", IEEE INFOCOM 2011 Workshop on Cloud Computing, p. 637-641.

(Continued)

*Primary Examiner* — El Hadji Sall
(74) *Attorney, Agent, or Firm* — David M. Quinn; William H. Hartwell

(57) ABSTRACT

Composite service provisioning is provided. One or more processors pre-provisions a first pool of service instances of a first composite service. One or more processors pre-provisions a second pool of service instances of a sub-service of the first composite service, wherein instances of the first pool of service instances have placeholder credentials identifying the second pool of service instances.

20 Claims, 6 Drawing Sheets

(56) References Cited

U.S. PATENT DOCUMENTS

| | | |
|---|---|---|
| 2012/0324079 A1 | 12/2012 | Quinet et al. |
| 2013/0013760 A1 | 1/2013 | Quinet et al. |
| 2013/0013767 A1 | 1/2013 | Stober et al. |
| 2013/0024573 A1 | 1/2013 | Kushida et al. |
| 2013/0124708 A1 | 5/2013 | Lee et al. |
| 2013/0185413 A1 | 7/2013 | Beaty et al. |
| 2014/0075031 A1 | 3/2014 | Doering et al. |

OTHER PUBLICATIONS

Di, et al., "Optimization and Stabilization of Composite Service Processing in a Cloud System", Copyright 2013 IEEE, 978-1-4799-0590-4/13/, 2013 IEEE/ACM 21st International Symposium on Quality of Service (IWQoS), Digital Object Identifier: 10.1109/IWQoS.2013.6550263, Publication Year: 2013, pp. 1-10.

"A Method for Constructing Virtual System Images for Composite Solutions without Network Re-targeting", An IP.com Prior Art Database Technical Disclosure, IPCOM000229334D, Jul. 22, 2013, pp. 1-4.

Dettori et al., "Composite Service Pre-Provisioning", U.S. Appl. No. 14/173,417, 45 pages, filed Feb. 5, 2014.

COMPOSITE SERVICE PRE-PROVISIONING

TECHNICAL FIELD

The present disclosure relates generally to the field of cloud computing, and more particularly to composite service pre-provisioning.

BACKGROUND

Cloud computing is a type of distributed computing, which is a software system in which components are located on networked computers that communicate and coordinate their actions by passing messages. The components interact with each other in order to achieve a common goal. In the software as a service model, the common goal is the provision of services to a client via a network. Such services often include application software and databases.

A cloud computing system can make many different services available to many different clients at one time. Services can be simple or complex, and services are often interdependent on other components. For example, an application software service may utilize a database service. A client can access the cloud system via a network in order to request and utilize a service provided by the cloud system. When a client requests a service, an instance of the service is allocated to the client.

SUMMARY

A method, system, and computer program product for composite service provisioning is provided. One or more processors pre-provisions a first pool of service instances of a first composite service. One or more processors pre-provisions a second pool of service instances of a sub-service of the first composite service, wherein instances of the first pool of service instances have placeholder credentials identifying the second pool of service instances.

DETAILED DESCRIPTION

Figure 1:
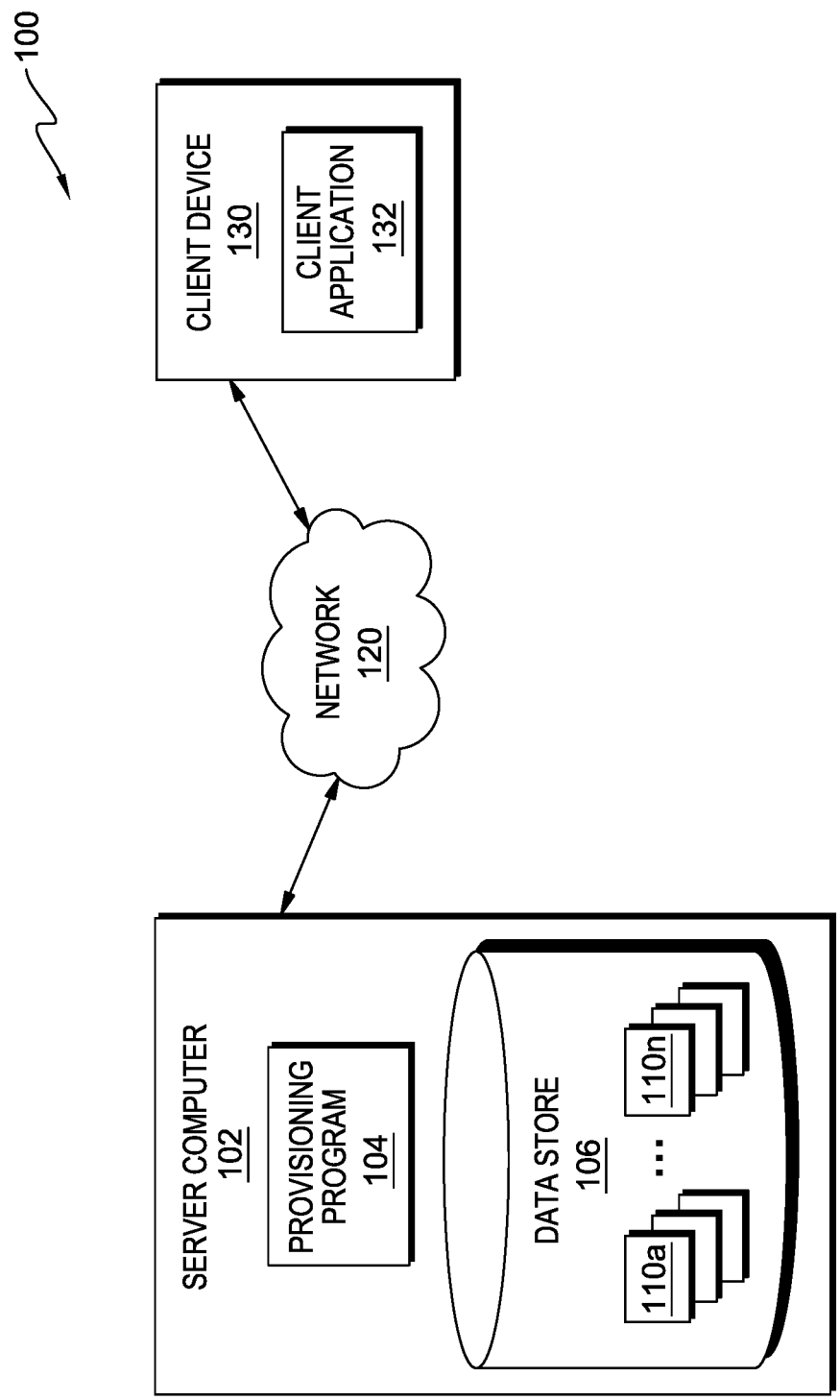
FIG. 1 is a functional block diagram illustrating a distributed data processing environment, in accordance with an embodiment of the present disclosure.

Embodiments of the present disclosure recognize that composite services are services that depend on one or more sub-services, each of which, in turn, may be a composite service. Further recognized is that provisioning an instance of a composite service is often slow, especially when the composite service depends upon more than one sub-service or even more than one tier of sub-services. Further recognized is that such provisioning time creates delays between when a service instance is requested and when it becomes available.

Embodiments of the present disclosure further recognize that pre-provisioning instances of a composite service traditionally requires pre-provisioning each composite service instance, pre-provisioning each component sub-service instance for each composite service instance, and allocating each component sub-service instance to a composite service instance. However, further recognized is that more than one composite service may depend upon the same component sub-service, and each instance of each component sub-service must be pre-provisioned. Further recognized is that pre-provisioning separate instances of each component sub-service for each instance of each composite service consumes resources inefficiently.

Embodiments of the present disclosure provide standby pools of pre-provisioned instances of sub-services. Providing the standby pools requires fewer service instances to be pre-provisioned, which reduces resource consumption while preserving speed of availability. Embodiments further provide size management of the pools of pre-provisioned instances, based on a potential upstream load, and allocation of component sub-service instances to composite service instances in response to a service request for a composite service instance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure will now be described in detail with reference to the Figures.

FIG. 1 is a functional block diagram illustrating a distributed data processing environment, generally designated 100, in accordance with one embodiment of the present disclosure.

Distributed data processing environment 100 includes server computer 102 and client device 130, both interconnected over network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server computer 102 and client device 130.

In various embodiments of the present disclosure, client device 130 can be a laptop computer, a tablet computer, a netbook computer, a personal computer (PC), a desktop computer, a server computer, a personal digital assistant (PDA), a smart phone, or any programmable electronic device capable of communicating with server computer 102 via network 120. In other embodiments, client device 130 may represent a computing system utilizing a plurality of computers as a client device system, such as in a cloud computing environment. In one such environment, the operations of client application 132 may be performed independently or in parallel (e.g., via distributed computing) by the plurality of computers of the computing system. In some embodiments, client device 130 represents a virtual machine that is executed by a hypervisor residing on a programmable electronic device capable of communicating with server computer 102 via network 120. Client device 130 includes client application 132.

Client application 132 operates to request a service instance. In one embodiment, client application 132 requests a service instance from provisioning program 104 of server computer 102 by sending provisioning program 104 a service request. A service is a process, resource, program, or data structure. The term "service" may also refer to composite services and sub-services. A composite service is a service that depends upon one or more other services, each of which is a sub-service of the composite service. An instance of a service is a specific realization of the service. For example, a composite service for mapping may include a sub-service for plotting zip code boundaries. A sub-service may be a composite service or a basic service. A basic service is a service that has no dependencies, meaning that the basic service does not depend upon any sub-services. In one embodiment, client application 132 resides on client device 130. In other embodiments, client application 132 may reside on server computer 102, another client device, another server computer, or another computing device, provided that client application 132 can access provisioning program 104.

Server computer 102 may be a laptop computer, a tablet computer, a netbook computer, a personal computer (PC), a desktop computer, a personal digital assistant (PDA), a smart phone, or any programmable electronic device capable of communicating with client device 130 via network 120. In other embodiments, server computer 102 may represent a server computing system utilizing a plurality of computers as a server system, such as in a cloud computing environment. In one such environment, the operations of provisioning program 104 and data store 106 may be performed independently or in parallel (e.g., via distributed computing) by the plurality of computers of the server computing system. In general, computing system 102 is representative of any programmable electronic device or combination of programmable electronic devices capable of executing machine-readable program instructions and communicating with other computing devices via a network. In some embodiments, server computer 102 represents a virtual machine that is executed by a hypervisor residing on a programmable electronic device capable of communicating with server computer 102 via network 120. Server computer 102 may include internal and external hardware components, as depicted and described in further detail with respect to FIG. 4. Server computer 102 includes provisioning program 104 and data store 106.

Data store 106 is a data repository that may be written to and read by provisioning program 104. Data store 106 includes instance pools 110a-110n. Instance pools 110a-110n may be stored to data store 106. An instance pool is a group of instances of a service. Alternatively, an instance pool is a group of references to instances of a service. In some embodiments, each of instance pools 110a-110n identifies at least one instance of a service. For example, an instance pool may include a reference that identifies an instance. In another example, an instance pool may include credentials (discussed more fully below) that identify an instance. In one embodiment, each instance of (i.e., identified by) instance pools 110a-110n resides within data store 106.

In certain embodiments, instances of instance pools 110a-110n may reside within another data store, another server computer, or client device 130, provided that each instance is accessible via network 120, for example by provisioning program 104. In some embodiments, data store 106 may be written to and read by external programs and entities to populate the database with pre-provisioned service instances. In one embodiment, data store 106 resides on server computer 102. In certain embodiments, data store 106 may reside on another server computer, another computing device, or client computing device 130, provided that data store 106 is accessible to provisioning program 104.

Provisioning program 104 operates to maintain pools of pre-provisioned service instances. In one embodiment, provisioning program 104 operates to maintain instance pools 110a-110n of data store 106. In some embodiments, provisioning program 104 provisions an instance by allocating resources for the instance and setting a flag associated with the instance. In various embodiments, resources include persistent storage space, memory space, network resources, processing resources, or a combination thereof. In one such embodiment, provisioning program 104 provisions an instance of a service in response to an active request for an instance of the service. In another embodiment, provisioning program 104 pre-provisions an instance of a service by provisioning the instance prior to receiving an active request for an instance of the service. In one embodiment, provisioning program 104 resides on server computer 102. In other embodiments, provisioning program 104 may reside on another server computer or another computing device, provided that provisioning program 104 is accessible to and can access data store 106 and client device 130.

Each instance pool corresponds to a service. An instance pool of a composite service depends upon instance pools of one or more sub-services. The size of an instance pool is the number of instances in the pool. In some embodiments, a service instance can be flagged, meaning that the flag can be set to indicate one of a plurality of statuses of the service instance. For example, the instance can be flagged as standby, reserved, active, or expired. In various embodiments, a service instance that is pre-provisioned but not allocated is flagged as standby, a service instance that is provisioned in response to a service request is flagged as reserved, a service instance that is allocated is flagged as active, and a service instance that is pre-provisioned in response to a service request but is not allocated prior to expiration of a reservation interval is flagged as expired.

In some embodiments, provisioning program 104 includes a garbage collection sub-routine. The garbage collection sub-routine is a background process that operates to identify and process service instances which are flagged as expired. In one embodiment, processing a service instance includes un-provisioning the service instance in order to reclaim the resources reserved for the service instance. In another embodiment, processing a service instance includes adding the service instance to an instance pool and flagging the service instance as standby.

Each service instance has corresponding credentials, which may be placeholder credentials or active credentials. Credentials may reference one or more service instances. For example, placeholder credentials may reference an instance pool, in which case the placeholder credentials correspond to and reference each service instance of the instance pool. Such service instances may be flagged as standby. In one embodiment, composite service instances include placeholder credentials that reference instance pools corresponding to each component sub-service on which the composite service depends. The placeholder credentials of the component sub-service are replaced with active credentials of an instance of the component sub-service in response to a service request for the composite service. Active credentials reference a service instance. For example, active credentials reference a service instance that is flagged as active. In various embodiments, active credentials for an instance may include authentication information, a memory location, a storage location, a network location at which the service instance resides, or a combination thereof. Credentials that include authentication information may further include a username, a password, or both. Authentication information of a network location can include a uniform resource locator ("URL") address at which the identified service instance is accessible.

Figure 2:
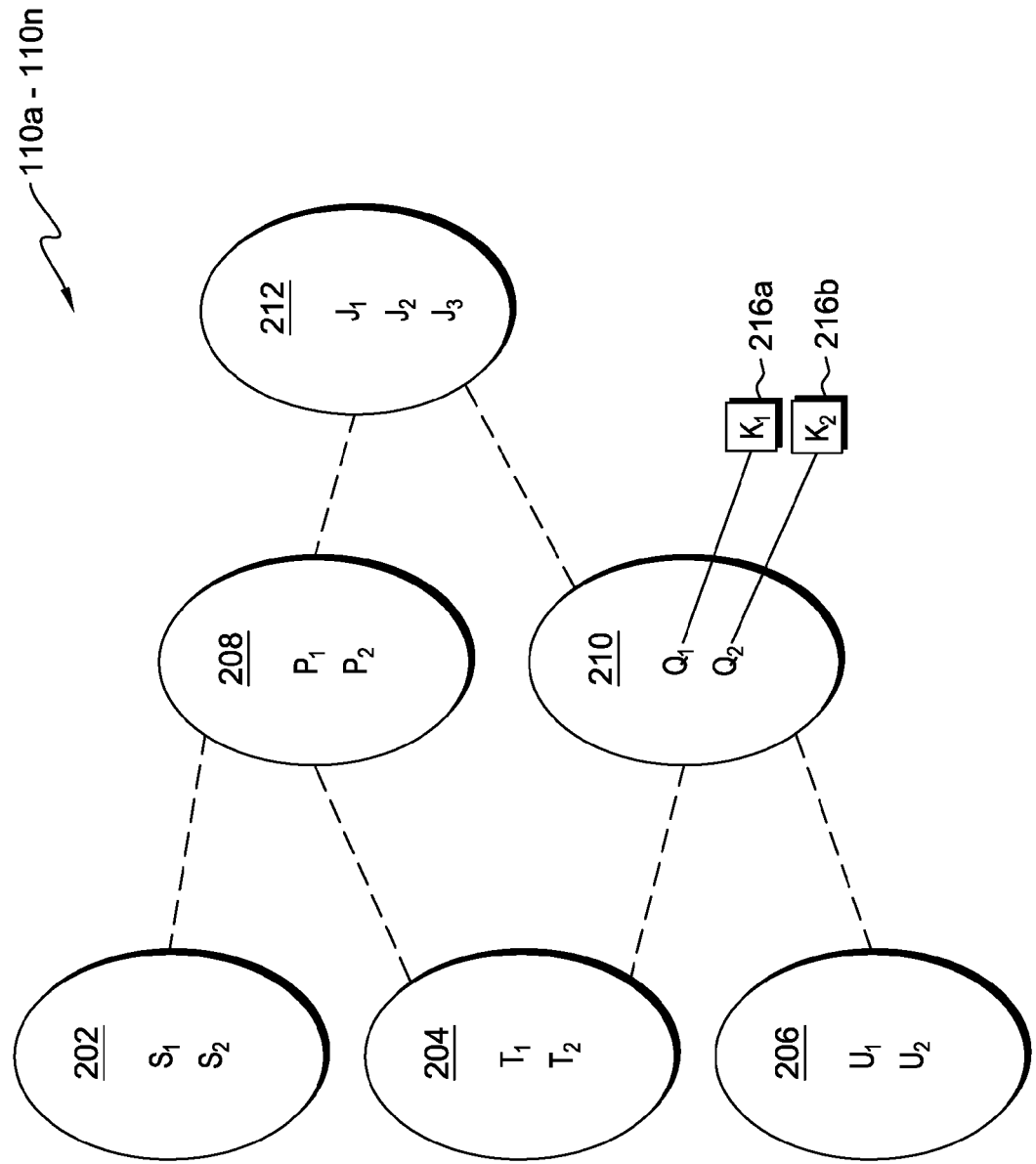
FIG. 2 is a functional diagram of an implementation of instance sets, in accordance with an embodiment of the present disclosure.

FIG. 2 is a functional diagram of an implementation of instance pools 110a-110n, in accordance with an embodiment of the present disclosure. It should be appreciated that FIG. 2 is provided as an example to facilitate illustration of one implementation of the disclosure and does not imply any limitations with regard to the variations or configurations in which different embodiments may be implemented. Many modifications to the depicted implementation may be made, some of which are discussed in connection to FIGS. 1 and FIGS. 3-6.

Instance pools 110a-110n include instance pools 202, 204, 206, 208, 210, and 212. Each of instance pools 110a-110n corresponds to a service, and each identifies a plurality of pre-provisioned instances of the service to which the instance pool corresponds. In various embodiments, each of instance pools 110a-110n corresponds to a service that can be either a composite service or a basic service, and the service may also be a component sub-service of an upstream composite service.

Instance pools 202, 204, 206, 208, and 210 each corresponds to a composite service, and instance pool 212 corresponds to a basic service. For example, instance pool 202 includes instances of a first composite service to which instance pool 202 corresponds, and instance pool 204 includes instances of a second composite service, to which instance pool 204 corresponds. A composite service is said to be "upstream" of the sub-service on which it depends. Similarly, a sub-service is said to be "downstream" of a composite service that depends on the sub-service. Thus, instance pools 202, 204, 206, 208, and 210 are each upstream of instance pool 212, which corresponds to a basic service that is a component sub-service of the services of each of instance pools 202, 204, 206, 208, and 210. However, instance pool 210 is not a component sub-service of instance pool 202, so instance pool 202 is not upstream of instance pool 210.

As depicted in FIG. 2, a dashed line indicates a relationship between two instance pools. In one embodiment, a dashed line between an upstream instance pool and a downstream instance pool indicates a relationship in which the service of the upstream pool depends upon the service of the downstream instance pool. For example, the dashed line between instance pool 206 and instance pool 210 indicates that the service of instance pool 206 depends upon the service of instance pool 210.

In some embodiments, an incompatible service is a service that is incompatible with instance pool pre-provisioning. In various examples, the incompatibility of a service may be an incompatibility with being identified by a standby pool, with returning placeholder credentials, or a combination thereof. For example, instances of an incompatible service may need to be allocated in order to be pre-provisioned. In some such embodiments, instances of an incompatible service are pre-provisioned and allocated to an instance of an upstream instance of an instance pool corresponding to a component service that is compatible with instance pool pre-provisioning. For example, service K is an incompatible service. In order to pre-provision instances of service K, each instance is allocated to an upstream service instance of service Q. Thus, instance $K_1$ 216a is pre-provisioned by allocating instance $K_1$ 216a to service instance $Q_1$ of instance pool 210.

As depicted in FIG. 2, a solid line indicates a relationship between two service instances. In one embodiment, a solid line between an upstream service instance and a downstream service instance indicates a relationship in which the downstream instance is allocated to the upstream service instance. For example, the solid line between service instance $K_2$ 216b and service instance $Q_2$ of instance pool 210 indicates a relationship in which service instance $K_2$ 216b is allocated to service instance $Q_2$ of instance pool 210.

A composite service can have more than one layer of dependencies. For example, instance pool 202 corresponds to composite service S and includes service instances $S_1$ and $S_2$, which depend upon service P. Further, instance pool 208 corresponds to composite service P and includes service instances $P_1$ and $P_2$, which depend upon service J. Further, instance pool 212 corresponds to basic service J and includes service instances $J_1$, $J_2$, and $J_3$, which have no dependencies.

The availability of each pre-provisioned instance of an instance pool is shared by an upstream service. Thus, the pool size of a downstream instance pool may be less than the sum of the pool sizes of all upstream instance pools. This principle is illustrated by the implementation depicted in FIG. 2. For example, pool 210 includes two service instances of service Q (i.e., service instances $Q_1$ and $Q_2$), each of which is available for allocation to any of the four upstream service instances of instance pools 204 and 206 (i.e., service instances $T_1$, $T_2$, $U_1$, and $U_2$). In some embodiments, when a service instance of an instance pool is allocated (e.g., to an upstream service instance or to a requestor), the service instance is removed from the instance pool, thereby decreasing the pool size of the instance pool. In one such embodiment, in response to the allocation of a service instance of an instance pool, provisioning program 104 operates to pre-provision another service instance of the instance pool in order to increase the pool size of the instance pool.

Figure 3:
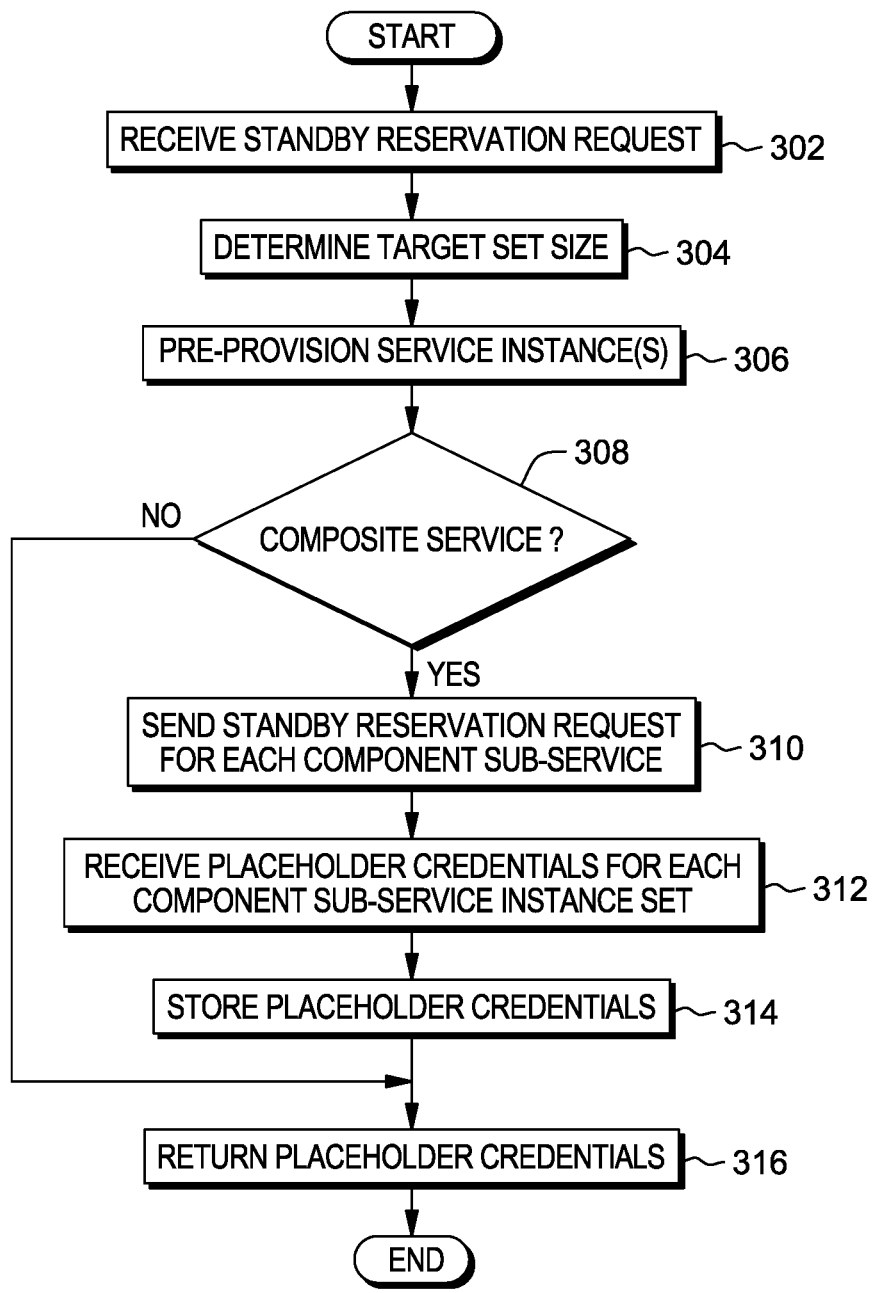
FIG. 3 is a flowchart depicting operational steps of a provisioning program, on a server computer within the distributed data processing environment of FIG. 1, in accordance with an embodiment of the present disclosure.

FIG. 3 is a flowchart depicting operational steps of a provisioning program, on a server computer within the distributed data processing environment of FIG. 1, in accordance with an embodiment of the present disclosure.

In step 302, provisioning program 104 receives a standby reservation request. In one embodiment, a standby reservation request identifies a service. In another embodiment, the standby reservation request identifies a service and a corresponding potential upstream load. The potential upstream load is a value that represents the potential demand for active requests for instances of the service by an upstream service. In some embodiments, provisioning program 104 identifies an instance pool corresponding to the service identified by the received standby reservation request. In other embodiments, provisioning program 104 creates an instance pool corresponding to the service identified by the standby reservation request.

In step 304, provisioning program 104 determines a target pool size of an instance pool corresponding to the service identified by the standby reservation request. Provisioning program 104 determines the target pool size based on a demand value for the service. The demand value is a value that represents the total potential demand for instance of a service. Provisioning program 104 determines the demand value based on, at least in part, the potential upstream load for the service identified by the standby reservation request. In various embodiments, provisioning program 104 may determine the demand value based on the potential upstream load of the standby reservation request, the potential upstream load of other upstream services, the pool size of an instance pool corresponding to the identified service, or a combination thereof. In one embodiment, a demand value may equal the sum of the potential upstream load of one or more upstream services.

In some embodiments, provisioning program 104 determines the target pool size based on the potential upstream load of the standby reservation request. For example, provisioning program 104 may receive a standby reservation request identifying a service and a potential upstream load of two instances. Provisioning program 104 may determine a target pool size based on the potential upstream load. Alternatively, provisioning program 104 may determine a demand value based on the potential upstream load and the pool size of an instance pool corresponding to the instance identified by the standby reservation request. In another embodiment, provisioning program 104 may determine the demand value based on the potential upstream load of a plurality of upstream services. For example, provisioning program 104 may determine a demand value based on a first potential upstream load of a first upstream service and a second potential upstream load of a second upstream service.

In some embodiments, provisioning program 104 determines a target pool size based on, at least in part, a pre-determined pool size policy. The pre-determined pool size policy limits the minimum or maximum number of instances in a pool. For example, the pre-determined pool size policy may limit the minimum target pool size to one service instance. Alternatively, the pool size policy may set the target pool size in proportion to the potential upstream load or to the demand value. For example, a pool size policy may establish the target pool size to three instances for every eight possible active requests as indicated by the potential upstream load. In such a case, provisioning program 104 may update the target pool size in response to a change in the potential upstream load or in the demand value.

In step 306, provisioning program 104 pre-provisions at least one service instance. In one embodiment, the at least one service instance belongs to an instance pool of instance pools 110a-110n. In one embodiment, provisioning program 104 pre-provisions service instances of an instance pool until the target pool size is reached for the instance pool. In one embodiment, provisioning program 104 pre-provisions a service instance by allocating system resources, initializing the service instance, and setting a status flag of the service instance. System resources may include, for example, storage space, memory space, network resources, processing resources, or any combination thereof. Further, provisioning program 104 initializes the service instance by storing the service instance to the reserved storage, and flags the service instance as standby. In various embodiments, provisioning program 104 reserves system resources of server computer 102, one or more other server computers, or both.

In decision 308, provisioning program 104 determines whether the service is a composite service. Provisioning program 104 determines whether the service is a composite service based on whether the service has one or more dependencies. Alternatively, provisioning program 104 determines whether the service is a composite service based on whether instances of the service include one or more placeholder credentials. If provisioning program 104 determines that the service is a composite service (decision 308, YES branch), then provisioning program 104 sends a standby reservation request for each component sub-service upon which the service depends (step 310). If provisioning program 104 determines that the service is not a composite service (decision 308, NO branch), then provisioning program 104 returns placeholder credentials for the service (step 316). For example, provisioning program 104 returns placeholder credentials identifying an instance pool corresponding to the service.

In step 310, provisioning program 104 sends a standby reservation request for each component sub-service. In various embodiments, the standby request include a potential upstream demand for the component sub-service based on the determined target pool size (see step 304), the received potential upstream demand (see step 302), or a combination thereof. In one embodiment, provisioning program 104 sends the standby reservation request to another instance of provisioning program 104. More than one instance of provisioning program 104 may operate in parallel. For example, a single server computer 102 may operate more than one instance of provisioning program 104 in parallel. In another example, more than one server computer may operate in parallel, each including at least one instance of provisioning program 104. In yet another example, provisioning program 104 operates recursively on more than one layer of dependencies for a composite services until provisioning program 104 determines that each remaining layer corresponds to basic service.

In step 312, provisioning program 104 receives placeholder credentials for each component sub-service. The placeholder credentials for each component sub-service identify an instance pool corresponding to the component sub-service. In one embodiment, provisioning program 104 receives the placeholder credentials in response to sending the standby reservation request for each component sub-service.

In step 314, provisioning program 104 stores placeholder credentials for each component sub-service. Provisioning program 104 stores the placeholder credentials of a component sub-service to the service instance being pre-provisioned, which is an instance of a composite service that depends on the component sub-service. Alternatively, provisioning program 104 stores the placeholder credentials to the instance pool corresponding to the composite service and associates the placeholder credentials with the composite service instance.

In step 316, provisioning program 104 returns placeholder credentials. Placeholder credentials of a service identify an instance pool corresponding to the service. Alternatively, placeholder credentials identify a service instance of an instance pool corresponding to the service. In one embodiment, provisioning program 104 returns the placeholder credentials by generating the placeholder credentials and sending the placeholder credentials to the requestor from which provisioning program 104 received the standby reservation request (see step 302). For example, provisioning program 104 may receive a standby reservation request in response to a recursive operation, in which case provisioning program 104 returns the placeholder credentials by completing the recursive operation. In another embodiment, provisioning program 104 returns the placeholder credentials by generating and storing the placeholder credentials. For example, provisioning program 104 may store the placeholder credentials to data store 106 and associate the placeholder credentials with an instance pool of instance pools 110a-110n that corresponds to the service identified by the standby reservation request (see step 302).

Figure 4:
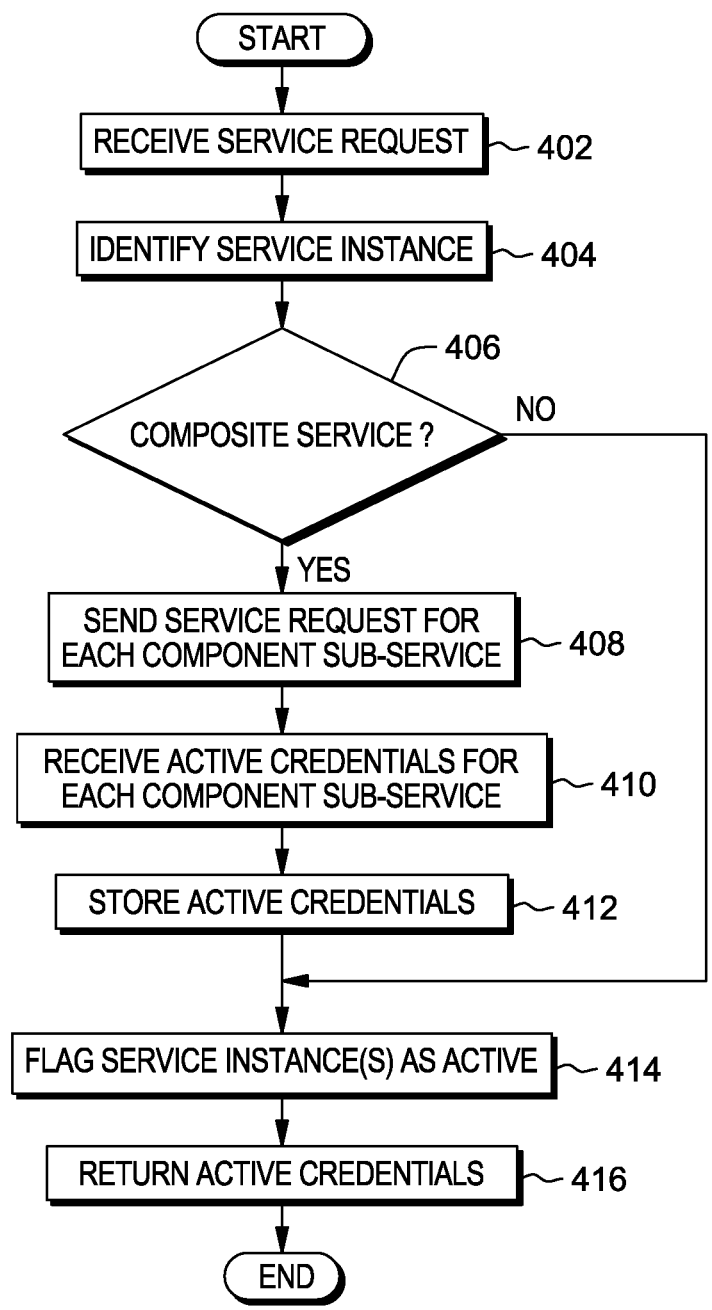
FIG. 4 is a flowchart depicting operational steps of a provisioning program, on a server computer within the distributed data processing environment of FIG. 1, in accordance with an embodiment of the present disclosure.

FIG. 4 is a flowchart depicting operational steps of a provisioning program, on a server computer within the distributed data processing environment of FIG. 1, in accordance with an embodiment of the present disclosure.

In step 402, provisioning program 104 receives a service request. The service request identifies a service and indicates a request for an active service instance of the identified service, which may correspond to an instance pool of instance pools 110a-110n. Provisioning program 104 receives the service request from, for example, client device 130. Alternatively, provisioning program 104 receives the service request from a parallel instance of provisioning program 104, or in response to a recursive operation of provisioning program 104.

In step 404, provisioning program 104 identifies a service instance. In one embodiment, provisioning program 104 identifies a service instance of an instance pool that corresponds to the service identified by the service request. The identified service instance is referred to as the target service instance. For example, provisioning program 104 identifies service instance $S_1$ of instance pool 202 (FIG. 2) in response to receiving a service request identifying service S.

In decision 406, provision program 104 determines whether the target service instance is an instance of a composite service. Provisioning program 104 determines whether the service is a composite service based on whether the service has one or more dependencies. Alternatively, provisioning program 104 determines whether the service is a composite service based on whether the target service instance includes one or more placeholder credentials. If provisioning program 104 determines that the target service instance is an instance of a composite service (decision 406, YES branch), then provisioning program 104 sends a service request for each component sub-service of the target service instance (step 408). If provisioning program 104 determines that the target service instance is not an instance of a composite service (decision 406, NO branch), then provisioning program 104 flags the target service instance as active (step 414).

In step 408, provisioning program 104 sends a service request for each component sub-service of the target service instance. In one embodiment, provisioning program 104 sends the standby reservation request to another instance of provisioning program 104. For example, a single server computer 102 may operate more than one instance of provisioning program 104 in parallel. In another embodiment, provisioning program 104 operates recursively on more than one layer of dependencies until provisioning program 104 determines that each remaining layer corresponds to a basic service.

In some embodiments, a composite service allows late-stage customization. In one embodiment, instances of a customizable composite service include placeholder credentials for more than one component sub-service alternatives for a single dependency. Any of the component sub-service alternatives can meet the dependency of the customizable composite service. A service request for an instance of a customizable composite service includes at least one customization parameter that identifies a component sub-service alternative. In another embodiment, instances of a customizable composite service may include alternative placeholder credentials for more than one dependency. For example, an instance of a customizable composite service includes alternative placeholder credentials for a first dependency and a second dependency, wherein the first dependency includes a first sub-service and a second sub-service as alternatives and the second dependency includes a third sub-service and a fourth sub-service as alternatives. In this case, the service request includes at least one customization parameter that identifies one alternative component sub-service per dependency. Provisioning program 104 sends a service request to each component sub-service alternative identified by the service request.

In step 410, provisioning program 104 receives active credentials for a service instance of each component sub-service. In one embodiment, provisioning program 104 receives the active credentials in response to sending a service request for each component sub-service.

In step 412, provisioning program 104 stores the active credentials for each component sub-service instance. In one embodiment, provisioning program 104 stores the active credentials to the target service instance. For example, provisioning program 104 can modify the target service instance by replacing the placeholder credentials that correspond to a component sub-service instance pool with the active credentials of an instance of the component sub-service.

In step 414, provisioning program 104 flags the target service instance as active. In one embodiment, provisioning program 104 flags as active each of the target service instance and any component sub-service instances of the target service instance.

In step 416, provisioning program 104 returns active credentials of the target service instance. The active credentials reference the target service instance. In one embodiment, provisioning program 104 returns active credentials for the target service instance by generating active credentials based on placeholder credentials of the target service instance and sending the active credentials to the requestor from which provisioning program 104 received the service request (see step 402). For example, provisioning program 104 may receive a service request in response to a recursive operation, in which case provisioning program 104 returns the active credentials by completing the recursive operation. In another embodiment, provisioning program 104 returns the active credentials by generating and storing the active credentials. For example, provisioning program 104 may store the active credentials to data store 106 and associate the active credentials with the target service instance.

In some embodiments, provisioning program 104 removes the target service instance from the instance pool to which the target service instance belongs. In one such embodiment, provisioning program 104 pre-provisions a service instance to replace the target service instance in the instance pool.

Figure 5:
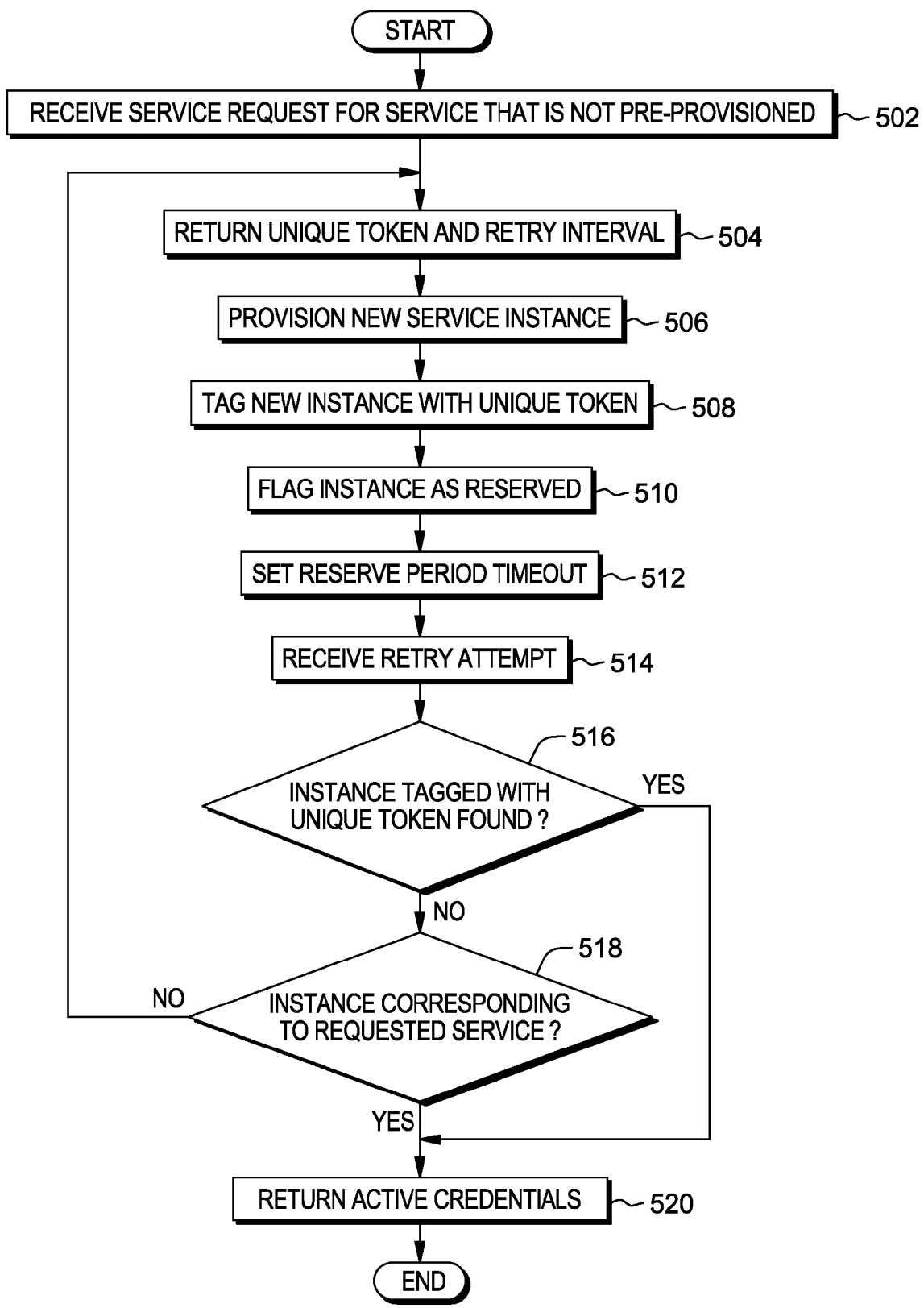
FIG. 5 is a flowchart depicting operational steps of a provisioning program, on a server computer within the distributed data processing environment of FIG. 1, in accordance with an embodiment of the present disclosure.

FIG. 5 is a flowchart depicting operational steps of a provisioning program, on a server computer within the distributed data processing environment of FIG. 1, in accordance with an embodiment of the present disclosure.

In step 502, provisioning program 104 receives a service request for a service that is not pre-provisioned. The service request identifies a target service. In one embodiment, the target service is an incompatible service. In another embodiment, the instance pool corresponding to the target service has a pool size of zero or otherwise includes no pre-provisioned service instances flagged as standby. Provisioning program 104 receives the service request from a requestor. In one embodiment, the requestor is a client device, such as client device 130.

In step 504, provisioning program 104 returns a unique token and a retry interval value to the requestor. In one embodiment, the unique token is a sequence of symbols or characters. In another embodiment, the unique token is a data structure. In one embodiment, the retry interval value represents a value of time for the requestor to wait before sending a retry attempt.

In step 506, provisioning program 104 provisions a new instance of the service identified by the service request. In one embodiment, provisioning a new service instance by allocating system resources, initializing the new service instance, and flagging the new service instance. For example, provisioning program 104 allocates system resources for the new service instance (including storage space, memory space, network resources, and processing resources), initializes the new service instance by storing the new service instance to the reserved storage, and flags the new service instance as active.

In step 508, provisioning program 104 tags the new service instance with the unique token. The unique token matches the unique token returned to the requestor (see step 504). In one embodiment, provisioning program 104 tags the new service instance with the unique token by associating the new service instance with the unique token.

In step 510, provisioning program 104 flags the new service instance as reserved. In one embodiment, provisioning program 104 flags the new service instance as reserved. The service instance remains flagged as reserved until expiration of a reserved period timeout, during which time provisioning program 104 prevents the service instance from being allocated unless provisioning program 104 receives the unique token.

In step 512, provisioning program 104 sets a reserve period timeout for the new service instance. The reserve period timeout is a period of time after which the reservation of the new service instance expires. In one embodiment, provisioning program 104 sets the reserve period timeout based on the retry interval provided to the requestor. For example, provisioning program 104 may set the reserve period timeout to a value greater than the retry interval.

In some embodiments, provisioning program 104 monitors the reserve period timeout for expiration. In response to the expiration of the reserve period timeout, provisioning program 104 removes the unique token tag from the new service instance. Alternatively, in response to expiration of the reserve period timeout, provisioning program 104 determines whether the new service instance corresponds to an instance pool of instance pools 110a-110n. If provisioning program 104 determines that the new service instance corresponds to an instance pool of instance pools 110a-110n, then provisioning program 104 flags the new service instance as standby and adds the new service instance to the corresponding instance pool. Alternatively, if the pool size of the corresponding instance pool equals the target pool size, then provisioning program 104 may flag the new service instance as expired. If provisioning program 104 determines that the new service instance does not correspond to an instance pool of instance pools 110a-110n, then provisioning program 104 flags the new service instance as expired. A garbage collection sub-routine of provisioning program 104 identifies a service instance flagged as expired and, in response, un-provisions the expired service instance, which includes releasing the resources associated with the expired service instance.

In step 514, provisioning program 104 receives a retry attempt from the requestor. In one embodiment, the retry attempt includes a service request for a service that is not pre-provisioned and a unique token. For example, provisioning program 104 may receive a retry attempt after the retry interval passes. The retry attempt may be a service request that identifies the service identified by the original service request (see step 502), and the retry attempt may include the unique token provided to the original requestor (see step 504).

In decision 516, provisioning program 104 determines whether the unique token of the retry attempt corresponds to the unique token with which a service instance is tagged. If provisioning program 104 determines that the unique token of the retry attempt corresponds to a service instance (decision 516, YES branch), then provisioning program 104 returns the active credentials of the service instance to the requestor (step 520). If provisioning program 104 determines that the unique token of the retry attempt does not correspond to a service instance (decision 516, NO branch), then provisioning program 104 proceeds to decision 518.

In decision 518, provisioning program 104 determines whether a pre-provisioned service instance corresponds to the service requested by the retry attempt. In one example, provisioning program 104 receives the retry attempt shortly after expiration of the reserve period timeout and the new service instance is either in an instance pool or is flagged as expired but is not yet processed by a garbage collection sub-routine, in which case provisioning program 104 may identify the new service instance as pre-provisioned even though the new service instance is no longer tagged with a unique token.

If provisioning program 104 determines that a pre-provisioned service instance corresponds to the service requested by the service request of the retry attempt (decision 518, YES branch), then provisioning program 104 returns active credentials of the pre-provisioned service instance (step 520). If provisioning program 104 determines that no pre-provisioned service instance corresponds to the service requested by the service request of the retry attempt (decision 518, NO branch), then provisioning program 104 returns a unique token and a retry interval to the requestor (step 504), and proceeds as described above with reference to step 504.

In one embodiment, provisioning program 104 returns the unique token of the retry attempt. In another embodiment, provisioning program 104 returns a new unique token. In one embodiment, provisioning program 104 returns a retry interval commensurate in length to the original retry interval. In another embodiment, provisioning program 104 returns a retry interval that exceeds the original retry interval.

Figure 6:
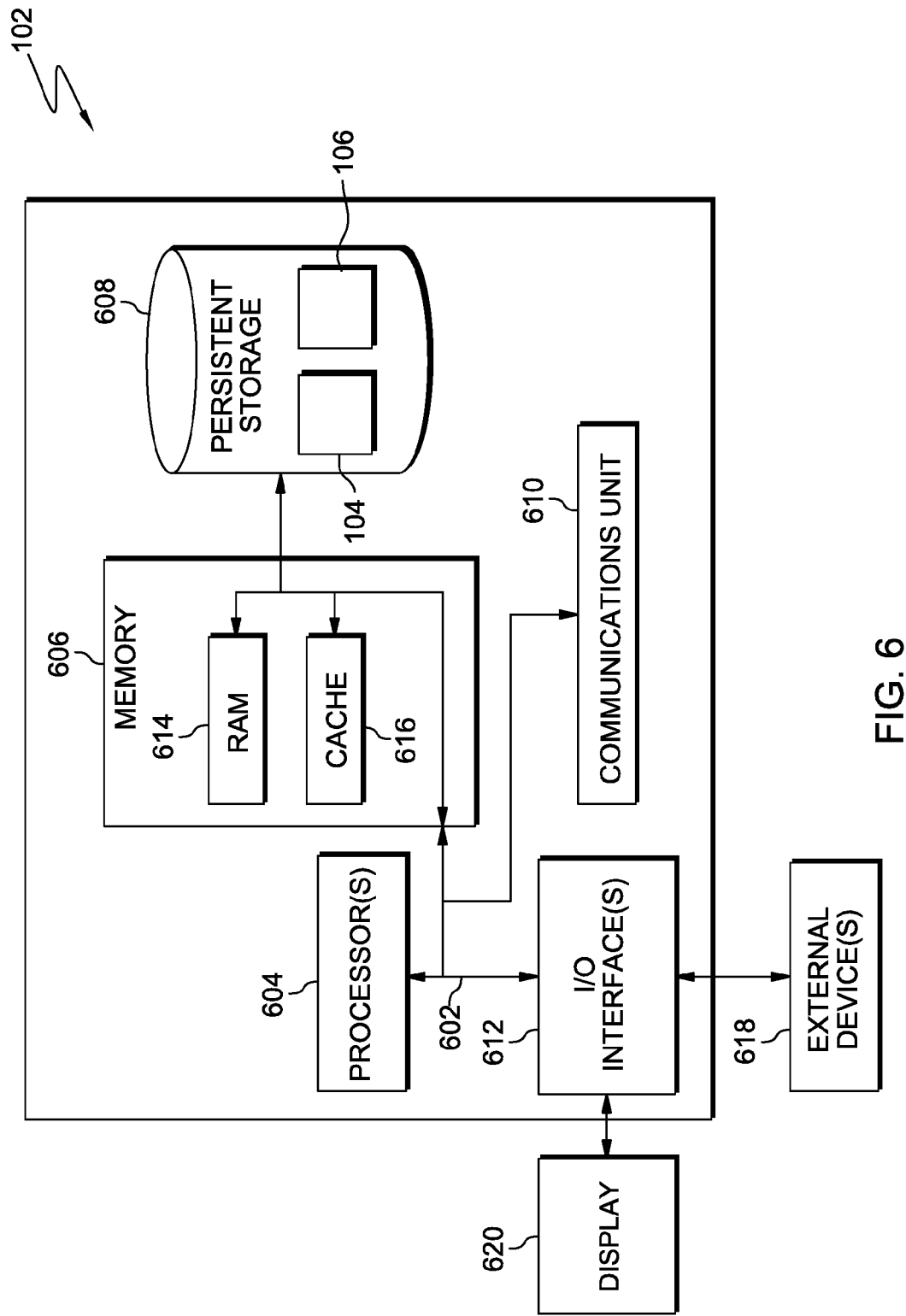
FIG. 6 depicts a block diagram of components of the server computer executing the provisioning program, in accordance with an embodiment of the present disclosure.

FIG. 6 depicts a block diagram of components of server computer 102 in accordance with an embodiment of the present disclosure. It should be appreciated that FIG. 6 provides only an illustration of one implementation and does not imply any limitations with regard to the environments in which different embodiments may be implemented. Many modifications to the depicted environment may be made.

Server computer 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Provisioning program 104 and instance pools 110a-110n are stored in persistent storage 608 for execution and/or access by one or more of the respective computer processor(s) 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of client device 130. In these examples, communications unit 610 includes one or more network interface cards. Communications unit 610 may provide communications through the use of either or both physical and wireless communications links. Provisioning program 104 and instance pools 110a-110n may be downloaded to persistent storage 608 through communications unit 610.

I/O interface(s) 612 allows for input and output of data with other devices that may be connected to server computer 102. For example, I/O interface(s) 612 may provide a connection to external devices 618 such as a keyboard, a keypad, a touch screen, and/or some other suitable input device. External devices 618 can also include portable computer-readable storage media such as, for example, thumb drives, portable optical or magnetic disks, and memory cards. Software and data used to practice embodiments of the present disclosure, e.g., provisioning program 104 and instance pools 110a-110n, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for composite service provisioning, the method comprising:
   pre-provisioning, by one or more processors, a first pool of service instances of a first composite service; and
   pre-provisioning, by one or more processors, a second pool of service instances of a sub-service of the first composite service, wherein instances of the first pool of service instances have placeholder credentials identifying the second pool of service instances.

2. The method of claim 1, further comprising:
   pre-provisioning, by one or more processors, a third pool of service instances of a second composite services, wherein instances of the third pool of service instances have placeholder credentials identifying the second pool of service instances.

3. The method of claim 1, further comprising:
   receiving, by one or more processors, an active service request identifying the first composite service; and
   modifying, by one or more processors, the placeholder credentials of an first instance of the first pool of service instances based, at least in part, on active credentials that identify a second instance of the second pool of service instances.

4. The method of claim 3, wherein modifying the placeholder credentials of the first instance based, at least in part, on the active credentials that identify the second instance comprises replacing the placeholder credentials of the first instance with the active credentials that identify the second instance.

5. The method of claim 1, wherein the second pool of service instances has a quantity that is based, at least in part, on a pre-determined size policy.

6. The method of claim 1, further comprising:
   receiving, by one or more processors, a service request that identifies a third composite service and at least one parameter for customizing a service, wherein the at least one parameter identifies at least one second sub-service; and
   allocating, by one or more processors, an instance of the third composite service based, at least in part, on the at least one parameter.

7. The method of claim 2, wherein a quantity of service instances of the second pool of service instances is less than a sum of a quantity of service instances of the first pool of service instances and a quantity of service instances of the third pool of service instances.

8. A computer program product for composite service provisioning, the computer program product comprising:
   a computer readable storage medium and program instructions stored on the computer readable storage medium, the program instructions comprising:
   program instructions to pre-provision a first pool of service instances of a first composite service; and
   program instructions to pre-provision a second pool of service instances of a sub-service of the first composite service, wherein instances of the first pool of service instances have placeholder credentials identifying the second pool of service instances.

9. The computer program product of claim 8, the program instructions further comprising:
   program instructions to pre-provision a third pool of service instances of a second composite services, wherein instances of the third pool of service instances have placeholder credentials identifying the second pool of service instances.

10. The computer program product of claim 8, the program instructions further comprising:
    program instructions to receive an active service request identifying the first composite service; and
    program instructions to modify the placeholder credentials of an first instance of the first pool of service instances based, at least in part, on active credentials that identify a second instance of the second pool of service instances.

11. The computer program product of claim 10, wherein the program instructions to modify the placeholder credentials of the first instance based, at least in part, on the active credentials that identify the second instance comprise program instructions to replace the placeholder credentials of the first instance with the active credentials that identify the second instance.

12. The computer program product of claim 8, wherein the second pool of service instances has a quantity that is based, at least in part, on a pre-determined size policy.

13. The computer program product of claim 8, the program instructions further comprising:
    receiving, by one or more processors, a service request that identifies a third composite service and at least one parameter for customizing a service, wherein the at least one parameter identifies at least one second sub-service; and
    allocating, by one or more processors, an instance of the third composite service based, at least in part, on the at least one parameter.

14. The computer program product of claim 9, wherein a quantity of service instances of the second pool of service instances is less than a sum of a quantity of service instances of the first pool of service instances and a quantity of service instances of the third pool of service instances.

15. A computer system for composite service provisioning, the computer system comprising:
    one or more computer processors;
    one or more computer readable storage media;
    program instructions stored on the one or more computer readable storage media for execution by at least one of the one or more processors, the program instructions comprising:
        program instructions to pre-provision a first pool of service instances of a first composite service; and
        program instructions to pre-provision a second pool of service instances of a sub-service of the first composite service, wherein instances of the first pool of service instances have placeholder credentials identifying the second pool of service instances.

16. The computer system of claim 15, the program instructions further comprising:
    program instructions to pre-provision a third pool of service instances of a second composite services, wherein instances of the third pool of service instances have placeholder credentials identifying the second pool of service instances.

17. The computer system of claim 15, the program instructions further comprising:
    program instructions to receive an active service request identifying the first composite service; and
    program instructions to modify the placeholder credentials of an first instance of the first pool of service instances based, at least in part, on active credentials that identify a second instance of the second pool of service instances.

18. The computer system of claim 17, wherein the program instructions to modify the placeholder credentials of the first instance based, at least in part, on the active credentials that identify the second instance comprise program instructions to replace the placeholder credentials of the first instance with the active credentials that identify the second instance.

19. The computer system of claim 15, wherein the second pool of service instances has a quantity that is based, at least in part, on a pre-determined size policy.

20. The computer system of claim 15, the program instructions further comprising:
    receiving, by one or more processors, a service request that identifies a third composite service and at least one parameter for customizing a service, wherein the at least one parameter identifies at least one second sub-service; and
    allocating, by one or more processors, an instance of the third composite service based, at least in part, on the at least one parameter.

* * * * *